US011599279B2

(12) United States Patent
Hirai et al.

(10) Patent No.: US 11,599,279 B2
(45) Date of Patent: Mar. 7, 2023

(54) INFORMATION PROCESSING SYSTEM AND DATA TRANSFER METHOD

(71) Applicant: Hitachi, Ltd., Tokyo (JP)

(72) Inventors: Tatsuya Hirai, Tokyo (JP); Masakuni Agetsuma, Tokyo (JP); Yoshinori Ohira, Tokyo (JP); Takahiro Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 48 days.

(21) Appl. No.: 17/470,318

(22) Filed: Sep. 9, 2021

(65) Prior Publication Data

US 2022/0236892 A1 Jul. 28, 2022

(30) Foreign Application Priority Data

Jan. 22, 2021 (JP) .............................. JP2021-009145

(51) Int. Cl.
*G06F 3/06* (2006.01)
(52) U.S. Cl.
CPC .......... *G06F 3/0622* (2013.01); *G06F 3/0604* (2013.01); *G06F 3/067* (2013.01); *G06F 3/0659* (2013.01)
(58) Field of Classification Search
None
See application file for complete search history.

(56) References Cited

U.S. PATENT DOCUMENTS

| 8,719,923 | B1* | 5/2014 | Miller ..................... G06F 21/34 |
| | | | 713/172 |
| 9,800,661 | B2 | 10/2017 | Ori |
| 2008/0240434 | A1 | 10/2008 | Kitamura |
| 2013/0227286 | A1* | 8/2013 | Brisson ................. H04L 63/062 |
| | | | 713/168 |
| 2020/0327461 | A1* | 10/2020 | Walters ............... H04W 12/108 |

FOREIGN PATENT DOCUMENTS

CN 104753870 A * 7/2015
JP 5117748 B2 1/2013

* cited by examiner

*Primary Examiner* — Brian R Peugh
(74) *Attorney, Agent, or Firm* — Baker Botts L.L.P.

(57) ABSTRACT

In an information processing system, a storage control server (storage control node) that has received a read request of data from a compute server (compute node) transmits the read request to a drive box. The drive box that has received the read request from the storage control server reads encrypted read target data corresponding to the read request from non-volatile storage media, decrypts the read target data with key data acquired at a predetermined timing, and then transmits the decrypted read target data to the compute server as a read request source.

15 Claims, 12 Drawing Sheets

| Cluster ID (CLID) | DBox IP ADDRESS | Target ID (TID) | Drive ID (DID) | Availability | Key ID | Key value |
|---|---|---|---|---|---|---|
| 379bc68a-18b0-... (CLUSTER A) | 10.80.32.0 | nqn.2020-08.a00... | CTSDAA00 | A | 540e9200-d08a-... | 9a25af01. |
| | | nqn.2020-08.a01... | CTSDAA01 | A | 540e9200-d08b-... | 386bd24c |
| | | ... | ... | | ... | ... |
| | | nqn.2020-08.a30... | CTSDAB00 | A | 540e9201-d16a-... | 217ec50f. |
| | | nqn.2020-08.a31... | CTSDAB01 | NA | 540e9201-d16b-... | 35a3281d |
| | | ... | ... | | | |
| | 10.80.32.1 | nqn.2020-08.b00... | DSXZAA00 | A | 540e9201-d24a-... | 9de83375 |
| | | nqn.2020-08.b01... | DSXZAB01 | NA | 540e9201-d24b-... | 846c0ab1 |
| | | ... | | ... | | |

| Cluster ID (CLID) | Target ID (TID) | Drive ID (DID) | Availability | Key ID | Key value |
|---|---|---|---|---|---|
| 379bc68a-18b0-... (CLUSTER A) | nqn.2020-08.a00... | CTSDAA00 | A | 540e9200-d08a-... | 9a25af01. |
| | nqn.2020-08.a01... | CTSDAA01 | A | 540e9200-d08b-... | 386bd24c |
| | ⋮ | ⋮ | ⋮ | ⋮ | ⋮ |
| | nqn.2020-08.a30... | CTSDAB00 | A | 540e9201-d16a-... | 217ec50f. |
| | nqn.2020-08.a31... | CTSDAB01 | NA | 540e9201-d16b-... | 35a3281d |
| 44a7d3fe-25d1-... (CLUSTER B) | nqn.2020-04.c00... | CTSDAC00 | A | 759f112a-30de-... | 4c4e359a |
| | nqn.2020-04.c01... | CTSDAC01 | A | 759f112a-30df-... | 71a9bc64 |
| | ⋮ | ⋮ | ⋮ | | |

900, 721

910, 912, 913, 914, 915, 916

901 (CLUSTER A), 902 (CLUSTER B)

INFORMATION PROCESSING SYSTEM AND DATA TRANSFER METHOD

BACKGROUND OF THE INVENTION

1. Field of the Invention

The present invention relates to an information processing system and a data transfer method, and is preferably applied to an information processing system and a data transfer method in which a compute node makes a read request for data which has been encrypted by a storage control node and then stored in a drive box.

2. Description of the Related Art

In the related art, a drive box of a storage system is mainly a JBOD (Just a Bunch Of Disks) in which a SAS (Serial Attached SCSI)/SATA (Serial ATA) drive is mounted in a drive slot to enable connection to a SAS network as an external interface. While JBOD is suitable for multiple drive connections, SAS has a characteristic of occupying a bus in units of connections. Thus, the above system has high connection processing overhead and is not suitable for performance improvement.

In recent years, a JBOD compatible with a NVMe (Non-Volatile Memory Express) protocol which is an external interface for a higher-speed SSD (Solid State Drive) has been commercialized to solve the above problem. However, the connection between the JBOD on which the SSD having the NVMe interface can be mounted, and a storage controller of the storage system is directly made by PCIe (PCI Express). Thus, it is not possible to increase the number of connectable drives much.

As a solution for solving such a problem, FBOF (Fabric-attached Bunch of Flash) having a high-performance interface (I/F) is recently started to be commercialized. The FBOF has a feature that FBOF can be connected to a high-performance network such as Ethernet (registered trademark) or Infiniband (registered trademark) and is compatible with NVMeoF (NVMe over Fabrics). NVMeoF is a standard enabling use of the NVMe protocol on a network.

With respect to the development of some types of networks and protocols described above, in a storage system in the related art, a mode in which a compute node is connected to a front-end (referred to as FE below) network of a storage system, and a drive box (referred to as a DBox below) is connected to a back-end (referred to as BE below) network independent of the FE network is often adopted. An FC (Fibre Channel) network or an Ether network is the mainstream as the FE network, and an SAS network is mainstream as the BE network. An input/output (I/O) of data in such a storage system is performed as follows. For example, in a case of reading data, when a storage controller receives a read request from a host computer, the storage controller reads data from a drive in a drive box and transmits the data to the host computer. Therefore, if the FBOF is used as a DBox and the BE network is changed to a network compatible with a high-performance I/F of the FBOF, it is possible to expand a data transfer band of the BE network in comparison to the data transfer band of the SAS network. However, in the read processing, since the storage controller transfers data to the host computer, there is a problem that the data transfer band of the storage controller forms a bottleneck even through a plurality of FBOFs are connected, and it is not possible to obtain the performance of the FBOF. Here, when both the FE network and the BE network are the Ether networks, and the FBOF includes an interface for connection to the Ether network, if the FBOF can be connected to both the FE network and the BE network, the FBOF can directly communicate with both the storage control node and the compute node. In other words, it is possible to directly transfer data between the compute node and the FBOF without passing through the storage controller (this is referred to as direct transfer below). When the direct transfer can be performed, the bottleneck in the performance of the storage controller is eliminated, so that there is a high possibility that data can be transferred at a high speed.

As a technology enabling the above-described high-speed data transfer, for example, U.S. Pat. No. 9,800,661 B discloses an invention in which agent software operating on a host computer (corresponding to the compute node) transmits an inquiry of a drive in an FBOF (drive box) corresponding to access destination data of the host computer and an address thereof, to a storage controller (corresponding to the storage control node), and the agent software directly accesses the drive in the FBOF based on obtained information.

Meanwhile, as described above, a storage medium such as an SSD or an NVMe drive is physically mounted on the drive box (DBox). In order to prevent an occurrence of a situation in which data stored in the storage medium is stolen in an available form when the storage medium is removed from the DBox and is intercepted, many products are provided with a write data encryption function of encrypting target data by the storage controller or the like and then writing the data into the storage medium.

Regarding such a storage system having the write data encryption function, for example, JP 5117748 B discloses an invention related to a storage virtualization device that including a determination unit that determines whether or not an external storage subsystem having an external logical volume designated in a write request received from a higher device (corresponding to the compute node) has an encryption function. In JP 5117748 B, when the determination result is negative, the storage virtualization device encrypts data according to the write request by the encryption function of the storage virtualization device and then transmits the encrypted data to an external storage subsystem. On the other hand, when the determination result is positive, the storage virtualization device transmits the data itself according to the write request, to the external storage subsystem without encrypting the data.

SUMMARY OF THE INVENTION

The functions disclosed in U.S. Pat. No. 9,800,661 B and JP 5117748 B are useful in terms of performance improvement, data theft, and data leakage prevention. However, in a case where the two functions are simply mounted on one storage system, when direct transfer is performed from the drive box to the compute node, data encrypted by the storage control node is transmitted to the compute node. Thus, there is a problem that it is not possible for the compute node to use the received data.

The present invention has been made in view of the above points, and an object of the present invention is to propose an information processing system and a data transfer method capable of, in reading of data encrypted and then stored in a drive box, decrypting target data by the drive box and directly transmitting the target data to a compute server without passing through a storage control server.

In order to solve such problems, according to the present invention, there is provided an information processing system in which a drive box including one or more non-volatile storage media that store data and a storage control server that controls a storage space provided by the drive box are connected to each other via a network. The storage control server manages key data for encrypting and decrypting the data. The drive box stores encrypted data and acquires the key data of the data at a predetermined timing. The storage control server that has received a read request of data from a compute server transmits the read request to the drive box. The drive box that has received the read request from the storage control server reads encrypted read target data corresponding to the read request from the non-volatile storage media, decrypts the read target data with the key data acquired at the predetermined timing, and then transmits the decrypted read target data to the compute server as a read request source.

In addition, in order to solve such problems, according to the present invention, there is provided a data transfer method by an information processing system in which a drive box including one or more non-volatile storage media that store data and a storage control server that controls a storage space provided by the drive box are connected to each other via a network. The method includes: by the storage control server, managing key data for encrypting and decrypting the data; by the drive box, storing encrypted data and acquiring the key data of the data at a predetermined timing; by the storage control server that has received a read request of data from a compute server, transmitting the read request to the drive box; and by the drive box that has received the read request from the storage control server, reading encrypted read target data corresponding to the read request from the non-volatile storage media, decrypting the read target data with the key data acquired at the predetermined timing, and then transmitting the decrypted read target data to the compute server as a read request source.

According to the present invention, in reading of data encrypted and stored in a drive box, it is possible to decrypt target data by the drive box and directly transmit the target data to a compute server without passing through a storage control server.

BRIEF DESCRIPTION OF THE DRAWINGS

FIG. 8 is a diagram illustrating an example of a configuration of a StrCtl key management table;
FIG. 9 is a diagram illustrating an example of a configuration of a DBox key management table.

DESCRIPTION OF THE PREFERRED EMBODIMENTS

Figure 1:
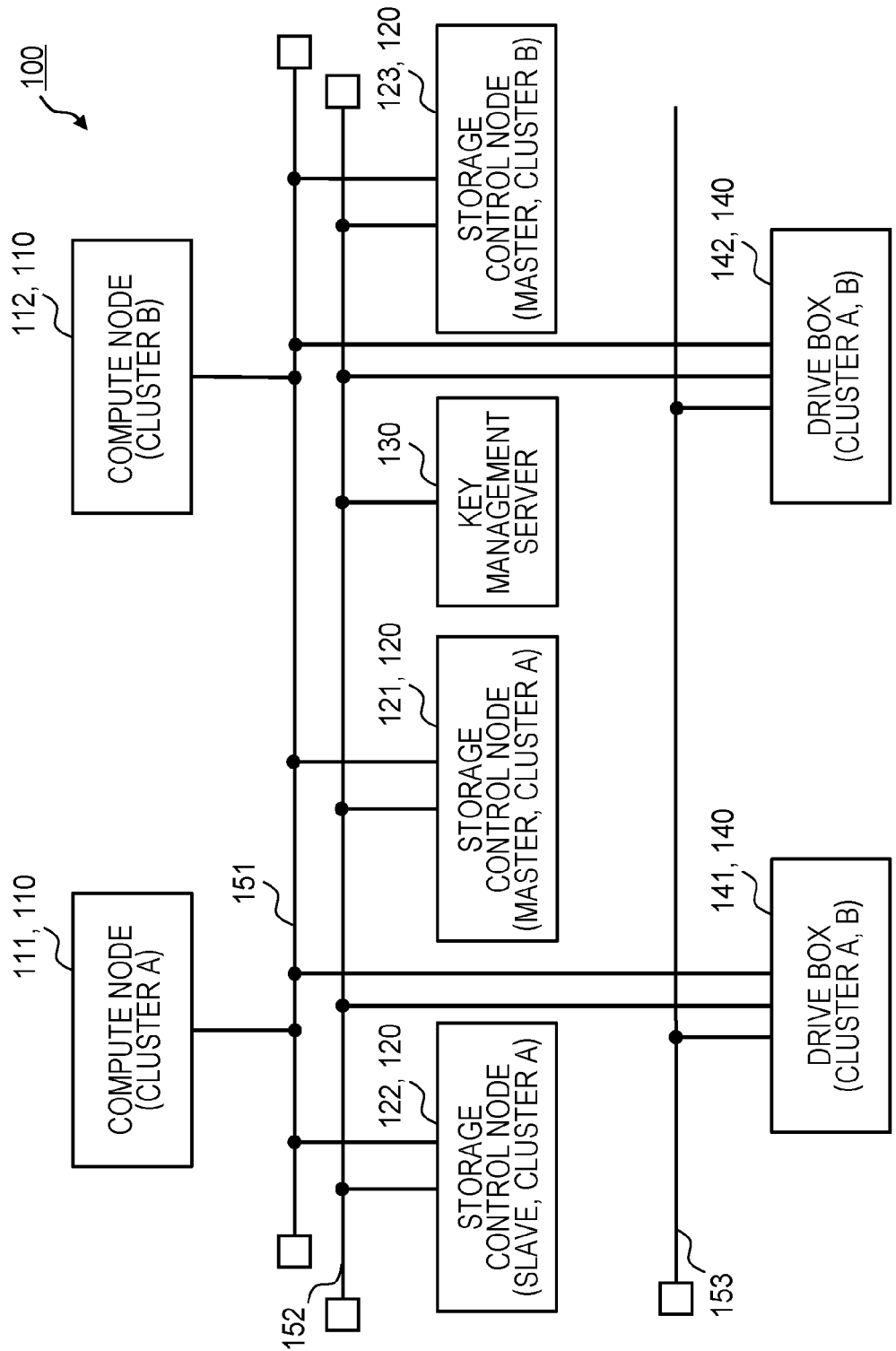
FIG. 1 is a block diagram illustrating an example of a configuration of an information processing system according to an embodiment of the present invention.

Hereinafter, an embodiment of the present invention will be described in detail with reference to the drawings.

Hereinafter, an embodiment of the present invention will be described in detail with reference to the drawings. The following description and drawings are examples for describing the present invention, and are omitted and simplified as appropriate for clarity of description. Not all combinations of features described in the embodiment are essential to the solution of the invention. The present invention is not limited to the embodiment, and all application examples consistent with the idea of the present invention are included in the technical scope of the present invention. Those skilled in the art can make various additions, modifications, and the like to the present invention within the scope of the present invention. The present invention can be carried out in various other forms. Unless otherwise specified, each component may be plural or singular.

In the following description, various types of information may be described by expressions such as a table and a list, but the various types of information may be expressed by data structures other than the above expressions. "XX table", "XX list", and the like may be referred to as "XX information" in order to indicate that the expression does not depend on the data structure. In describing the content of each piece of information, expressions such as "identification information", "identifier", "name", "ID", and "number" are used, but these expressions can be replaced with each other.

In addition, in the following description, in a case where the same kind of elements are described without being distinguished, reference signs or common numbers in the reference signs are used. In a case where the same kind of elements are described while being distinguished, the reference signs of the elements may be used, or IDs assigned to the elements may be used instead of the reference signs.

In the following description, a program may be installed on a device such as a computer from a program source. The program source may be, for example, a program distribution server or a computer-readable storage medium. When the program source is a program distribution server, the program distribution server may include a processor (for example, a CPU (central processing unit) and a storage resource, and the storage resource may further store a distribution program and a program as a distribution target. Then, when the processor of the program distribution server executes the distribution program, the processor of the program distribution server may distribute a distribution target program to another computer. In the following description, two or more programs may be implemented as one program, or one program may be implemented as two or more programs.

In addition, in the following description, a processing procedure of processing by executing the program may be illustrated in a sequence diagram or the like. In the drawings, for the purpose of intuitive understanding, an outline of the processing may be illustrated with a notation such as a command line, but this does not necessarily coincide with an actual processing command. Specifically, for example, the notation "/ w A" means designation or attachment of A. The notation "A| |B" means joining of A and B (making A and B into a set).

(1) Configuration (1-1) System Configuration

FIG. 1 is a block diagram illustrating an example of a configuration of an information processing system 100 according to an embodiment of the present invention. As illustrated in FIG. 1, the information processing system 100 according to the present embodiment includes one or more compute nodes 110 (individually, compute nodes 111 and 112), one or more storage control nodes 120 (individually, storage control nodes 121, 122, and 123), a key management server 130, and one or more drive boxes 140 (individually, drive boxes 141 and 142).

The compute node 110 (111 or 112) is a general-purpose computer device (server) that functions as a host (higher device) for the storage control node 120. The compute node 110 may be a virtual computer device such as a virtual machine. The compute node 110 requests the storage control node 120 to write or read data via a storage service network 151 in response to a user operation or a request from an application program operating on the node. In writing data, the compute node 110 transmits write target data to the storage control node 120 in response to a write request. A series of processes related to data writing will be described later in detail with reference to FIG. 12, as user data write processing. In reading data, the compute node 110 transmits a read request to the storage control node 120, and then receives read target data from the storage control node 120 or the drive box 140. The storage control node 120 that has received the read request determines from which of the storage control node 120 and the drive box 140 the read target data is transmitted as a response, to the compute node 110. A series of processes related to data reading will be described later in detail with reference to FIGS. 13 and 14, as user data read processing.

The storage control node 120 (121, 122, or 123) is a computer device (server), and it is assumed that a plurality of nodes form one cluster. A node having a function and a role of managing a cluster is referred to as a master, and a node other than the master is referred to as a slave. FIG. 1 illustrates, as an example, that the storage control nodes 121 and 122 belong to one cluster and the storage control node 123 belongs to another cluster. In the present embodiment, a cluster to which the storage control nodes 121 and 122 belong is referred to as a "cluster A", and a cluster to which the storage control node 123 belongs is referred to as a "cluster B". In this case, the storage control node 121 is a master of the cluster A, the storage control node 122 is a slave of the cluster A, and the storage control node 123 is a master of the cluster B. Although three storage control nodes 121 to 123 are illustrated in FIG. 1 for convenience, each cluster may actually include more nodes. The compute node 111 is assumed to request a storage system constituting the cluster A to write or read data, and the compute node 112 is assumed to request a storage system constituting the cluster B to write or read data.

The key management server 130 is a server having functions of generating and storing key data required for encrypting data transmitted from the compute node 110 to the storage control node 120 for the purpose of writing. The key management server 130 is connected to the storage control nodes 121 and 123 being the masters of the clusters A and B, via a management network 152. As a method generally used in communication between the storage control node 121 or 123 as the master, and the key management server 130, there is a method in which messages and data are transferred in accordance with a KMIP (Key Management Interoperability Protocol) protocol, and the transferred data is protected (encrypted) in accordance with according to a TLS (Transport Layer Security) protocol. Such a transfer protocol is referred to as KMIP over TLS below.

The drive box 140 is a storage device to which a data storage drive is internally connected. The drive box 140 receives a data write request or a data read request from the storage control node 120, and writes data in the corresponding drive or reads data stored in the corresponding drive. As described above, in the case of data read processing, the drive box 140 transmits data read from a drive in the drive box 140 itself to the storage control node 120 or directly transmits the data to the compute node 110, in response to an instruction from the storage control node 120.

The compute node 110 and the storage control node 120 are connected to each other via the storage service network 151. The storage service network 151 includes, for example, an Ether network, a fiber channel (Fibre Channel), Infiniband, and a wireless LAN (local area network). In the present embodiment, the drive box 140 is also connected to the storage service network 151.

The storage control node 120 and the drive box 140 are connected to each other via a back-end network 153. The back-end network 153 includes, for example, a LAN, an Ether network (registered trademark), Infiniband, and a wireless LAN.

The storage service network 151 and the back-end network 153 may be configured by the same network. As described above, the storage control node 120, the key management server 130, and the drive box 140 are also connected to the management network 152.

Figure 2:
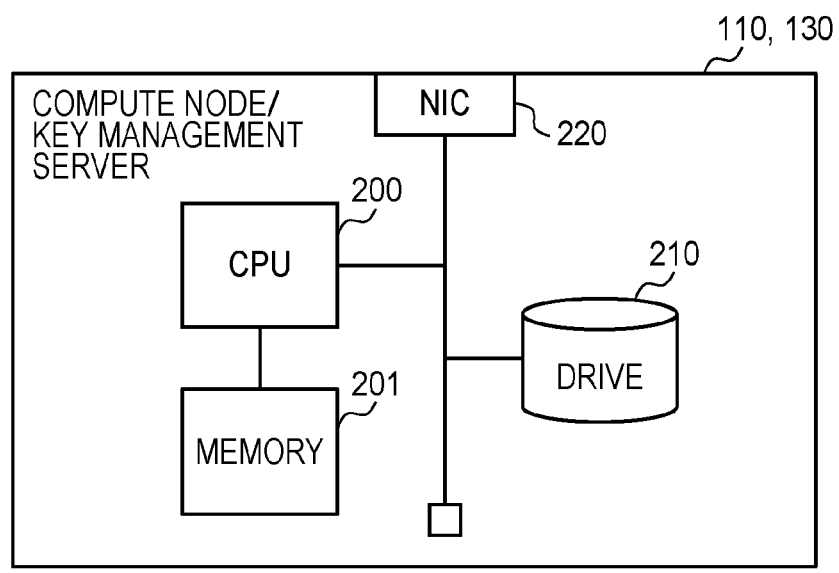
FIG. 2 is a block diagram illustrating an example of a hardware configuration of a compute node and a key management server.

FIG. 2 is a block diagram illustrating an example of a hardware configuration of the compute node 110 and the key management server 130. As illustrated in FIG. 2, each of the compute node 110 and the key management server 130 includes one or more CPUs 200, one or more memories 201, one or more storage drives (referred to as drives below) 210 capable of statically storing information, and a network communication unit 220.

The CPU 200 is a processor that controls the overall operation of the own node. The memory 201 is implemented using a non-volatile semiconductor memory or a volatile semiconductor memory such as a SRAM (Static Random Access Memory) or a DRAM (Dynamic Random Access Memory). The memory 201 is used as a work memory of the CPU 200 to temporarily store various programs and necessary data. At least one or more CPUs 200 execute the program stored in the memory 201 to perform various types of processing described later. Data placed on the memory 201 of the compute node 110 will be described later with reference to FIG. 5.

The drive 210 includes a large-capacity non-volatile storage device such as an HDD (Hard Disk Drive), an SSD, or an SCM (Storage Class Memory). The storage device constituting the drive 210 includes an interface such as NVMe, SAS, or SATA, and is connected to each device through the interface.

The drive 210 stores an OS (Operation System) that operates on the own node (compute node 110 or key management server 130), application software that operates on the OS, a virtual machine monitor (hypervisor) that operates under the OS to operate a virtual environment, a guest OS that operates on the virtual machine monitor, various types of application software that operates on the guest OS, and the like. In the case of the drive 210 of the key management server 130, key data which is generated by key management application software and stored in the key management server is also stored.

The network communication unit 220 is an interface for causing the compute node 110 to communicate with the storage control node 120 or the drive box 140 via the storage service network 151 and for causing the key management server 130 to communicate with the storage control node 120 or the drive box 140 via the management network 152. For example, the network communication unit 220 is an NIC (Network Interface Card).

Figure 3:
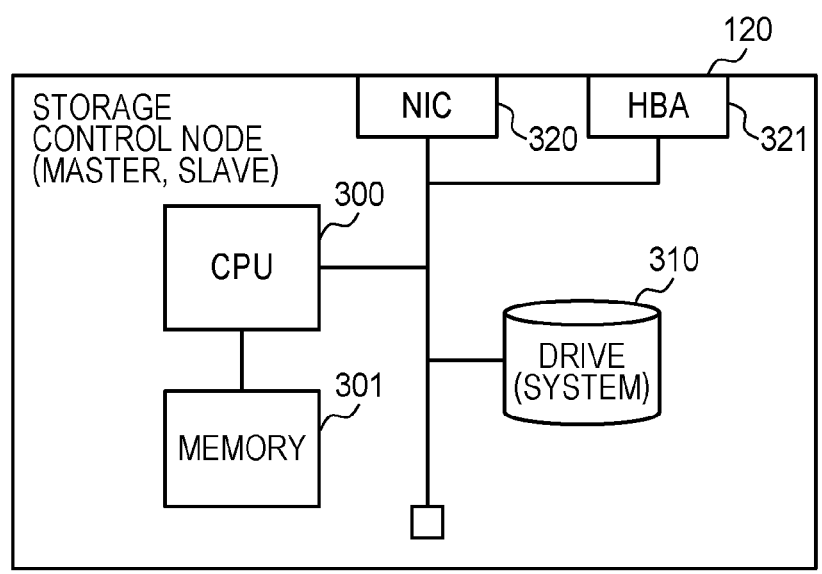
FIG. 3 is a block diagram illustrating an example of a hardware configuration of a storage control node.

FIG. 3 is a block diagram illustrating an example of a hardware configuration of the storage control node 120. As illustrated in FIG. 3, the storage control node 120 includes one or more CPUs 300, one or more memories 301, one or more drives 310, a first network communication unit 320, and a second network communication unit 321. The number of the first and second network communication units 320 and 321 may be two or more.

The first and second network communication units 320 and 321 are interfaces for communicating with the compute node 110, the storage control node 120 other than the own node, the drive box 140, and the like via the storage service network 151 and the back-end network 153. The first network communication unit 320 is, for example, an NIC. The second network communication unit 321 is, for example, an HBA (Host Bus Adapter).

The CPU 300 is a processor that controls the overall operation of the own node. The memory 301 is implemented using a non-volatile semiconductor memory or a volatile semiconductor memory such as an SRAM or a DRAM. The memory 301 is used as a work memory of the CPU 300 to temporarily store various programs and necessary data. At least one or more CPUs 300 execute the program stored in the memory 301 to perform various types of processing described later. Data placed on the memory 301 of the storage control node 120 including storage control software described later will be described later with reference to FIG. 6.

The drive 310 includes a large-capacity non-volatile storage device such as an HDD, an SSD, or an SCM. The storage device constituting the drive 310 includes an interface such as NVMe, SAS, or SATA, and is connected to each device through the interface.

The drive 310 stores an OS that operates on the own node, software (referred to as storage control software below) that implements a function as a storage that operates on the OS, a virtual machine monitor (hypervisor) for constructing a virtual environment, a guest OS that operates on the virtual machine monitor, and the like. In an environment in which the virtual machine monitor and the guest OS operate, the storage control software may operate on the guest OS. The storage control node 120 may be configured as the same node as the compute node 110.

Figure 4:
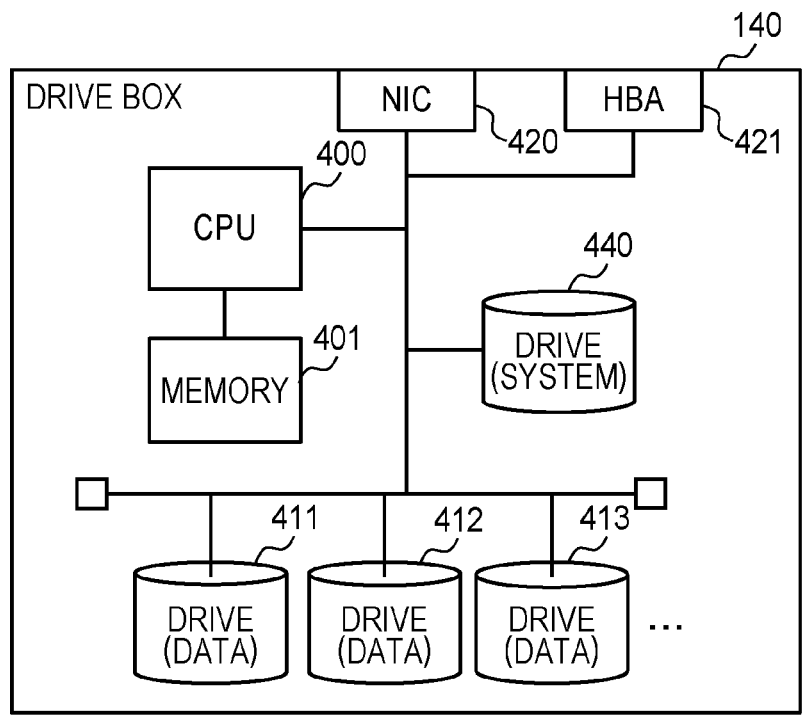
FIG. 4 is a block diagram illustrating an example of a hardware configuration of a drive box.

FIG. 4 is a block diagram illustrating an example of a hardware configuration of the drive box 140. As illustrated in FIG. 4, the hardware configuration of the drive box 140 is similar to the hardware configuration of the storage control node 120 illustrated in FIG. 3 except for drives 410 to 413. Specifically, the drive box 140 includes one or more CPUs 400, one or more memories 401, one or more drives 410 to 413, a first network communication unit 420, and a second network communication unit 421. The number of the first and second network communication units 420 and 421 may be two or more.

The CPU 400 is a processor that controls the overall operation of the own node. The memory 401 is implemented using a non-volatile semiconductor memory or a volatile semiconductor memory such as an SRAM or a DRAM. The memory 401 is used as a work memory of the CPU 400 to temporarily store various programs and necessary data. At least one or more CPUs 400 execute the program stored in the memory 401 to perform various types of processing described later. Data placed on the memory 401 of the drive box 140 including drive box control software described later will be described later with reference to FIG. 7.

The drives 410 to 413 include a large-capacity non-volatile storage device such as an HDD, an SSD, and an SCM. The storage devices constituting the drives 410 to 413 include interfaces such as NVMe, SAS, and SATA, and are connected to each device through the interfaces.

Among the drives 410 to 413, the drive 410 is a drive having a role similar to the role of the drive 310 in the storage control node 120. That is, the drive 410 stores an OS that operates on the own node, software (referred to as drive box control software below) for managing the drive box 140 that operates on the OS, and transmitting and receiving data to and from the storage control node 120 and the compute node 110, and the like.

The drives 411 to 413 are drives for storing data (also referred to as user data below) transmitted by the software that operates on the compute node 110. Although FIG. 4 illustrates three drives 411 to 413, the number of drives is not limited.

As described above, in the drive box 140, the role of the drive 410 is different from the role of the drives 411 to 413. In order to clearly indicate the difference in the roles, the drive 410 may be referred to as a system drive and the drives 411 to 413 may be referred to as data drives.

(1-2) Program and Data Configuration

Programs and data stored and used in each memory of the compute node 110, the storage control node 120, or the drive box 140 will be described with reference to FIGS. 5 to 9.

Figure 5:
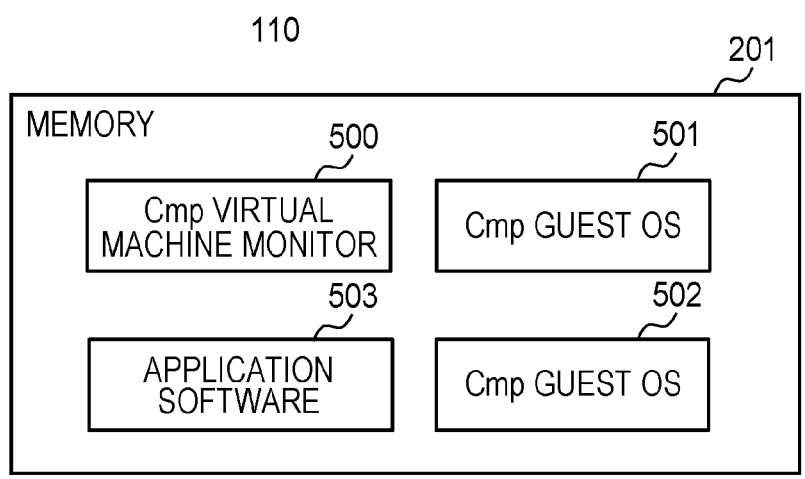
FIG. 5 is a block diagram illustrating an example of data placed in a memory of the compute node.

FIG. 5 is a block diagram illustrating an example of data placed in the memory 201 of the compute node 110.

In the case of FIG. 5, a Cmp virtual machine monitor 500 and Cmp guest OSs 501 and 502, which are basic software, and application software 503 that operates on the basic software are placed in memory 201. "Cmp" indicates operating on the compute node 110. In this example, the virtual machine monitor and the guest OS are assumed as the basic software, but the basic software is not limited to this form. For example, a host type (form in which a virtual machine monitor is operated on a host OS), a form in which an OS is operated on a bare machine and application software is operated on the OS, or a form in which a container base is operated on an OS and a container is operated on the container base.

Figure 6:
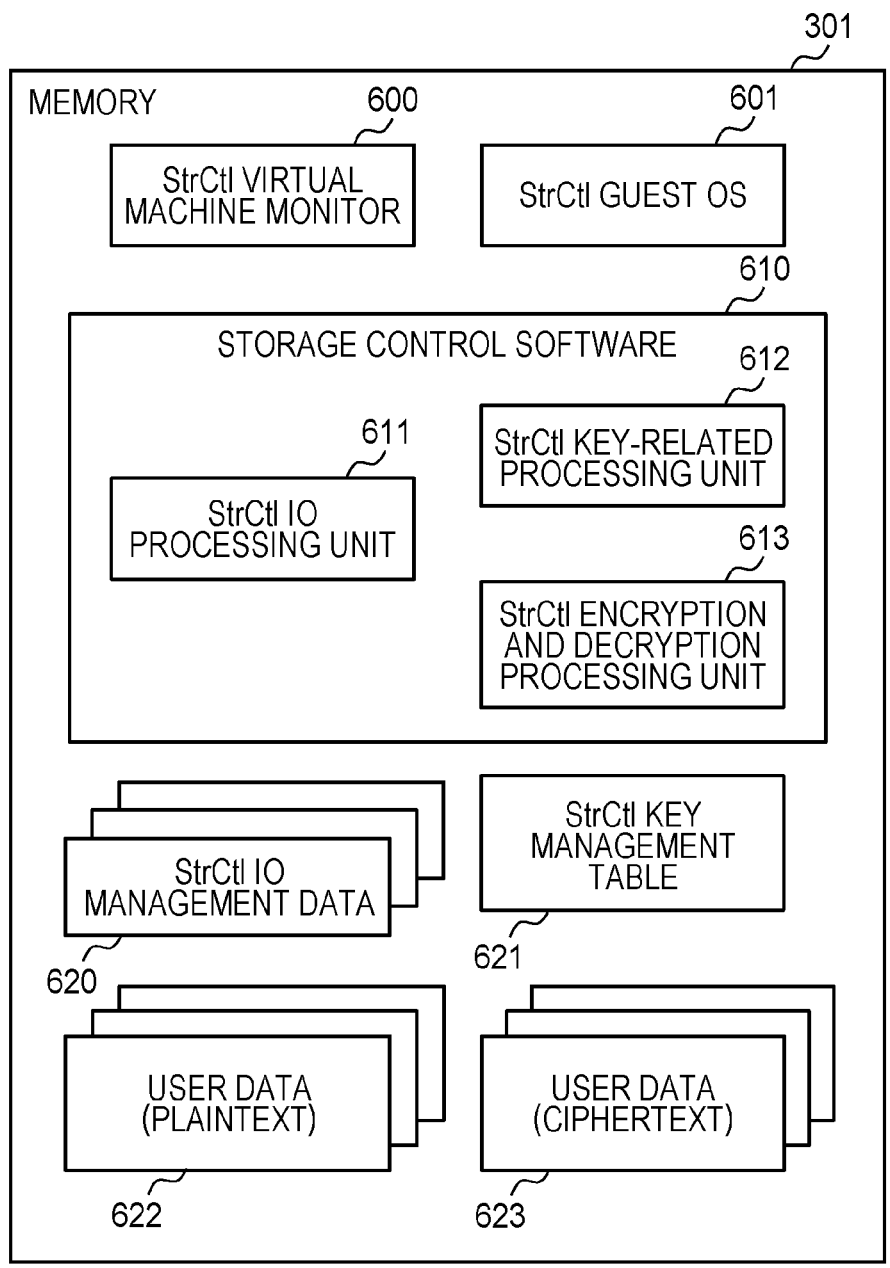
FIG. 6 is a block diagram illustrating an example of data placed in a memory of the storage control node.

FIG. 6 is a block diagram illustrating an example of data placed in the memory 301 of the storage control node 120.

In the case of FIG. 6, a StrCtl virtual machine monitor 600 and a StrCtl guest OS 601, which are the basic software, storage control software 610, StrCtl IO management data 620, a StrCtl key management table 621, plaintext user data 622, and ciphertext user data 623 are placed in the memory 301. Further, as illustrated in FIG. 6, the storage control software 610 includes a StrCtl IO processing unit 611, a StrCtl key-related processing unit 612, and a StrCtl encryption and decryption processing unit 613. "StrCtl" indicates operating on the storage control node 120.

The StrCtl IO management data 620 includes, for example, a content (including information specifying a storage area as write destination or a read source) of a write request or a read request received from the compute node 110, and a content (including information specifying a storage area as a write destination or a read source, in the drive box 140) of a request transmitted to the drive box 140 by the StrCtl IO processing unit 611 of the node in response to the request.

The StrCtl key management table 621 is a table in which a storage area as a write destination/read source of user data, an identifier of key data allocated to this storage area, and key data specified by the identifier are associated with each other. Details of the StrCtl key management table 621 will be described later with reference to FIG. 8. In the present embodiment, it is assumed that one piece of key data is assigned to one physical drive. Such a key assignment method has an advantage of facilitating management of key data including migration of user data to another drive and discard of the user data when one physical drive is discarded or replaced due to failure or the like, and thus is highly practical.

As described above, the storage control software 610 includes the StrCtl IO processing unit 611, the StrCtl key-related processing unit 612, and the StrCtl encryption and decryption processing unit 613.

Among the units, the StrCtl IO processing unit 611 receives a write/read request from the compute node 110 (also receives plaintext data as a write target in the case of the write request) and places StrCtl IO management data 620 on the memory 301. In addition, the StrCtl IO processing unit 611 transmits the write/read request to the drive box 140 specified by information on a write destination/read source, which is included in the StrCtl IO management data 620 (also transmits ciphertext user data 623 as a write target in the case of the write request). When the StrCtl IO processing unit 611 transmits the read request to the drive box 140, after the target user data is placed on the memory 401 in the drive box 140, the StrCtl IO processing unit 611 notifies the drive box 140 of whether the drive box 140 transmits the user data to the StrCtl IO processing unit 611 or directly transmits (directly transfers) the compute node 110 being a request source of reading the user data.

The StrCtl key-related processing unit 612, for example, performs communication with the key management server 130 (transmission of a request to generate key data, reception of an identifier (described as "Key ID" later) of key data generated in response by the key management server 130, transmission of a request to transmit key data to the key management server 130, reception of key data transmitted from the key management server 130, and the like), and places key data received from the key management server 130, in the StrCtl key management table 621.

The StrCtl encryption and decryption processing unit 613 receives information specifying the drive as the write destination/read source from the StrCtl IO processing unit 611, and then acquires key data from the StrCtl key management table 621 based on the received information. Further, when the StrCtl encryption and decryption processing unit 613 has received the information specifying the drive as the write destination from the StrCtl IO processing unit 611 (in a case of writing), the StrCtl encryption and decryption processing unit 613 encrypts the plaintext user data 622 and places the ciphertext user data 623 on the memory 301. When the StrCtl encryption and decryption processing unit 613 has received the information specifying the drive as the read source from the StrCtl IO processing unit 611 (in a case of reading), the StrCtl encryption and decryption processing unit 613 decrypts the ciphertext user data 623 and places the plaintext user data 622 on the memory 301.

Figure 7:
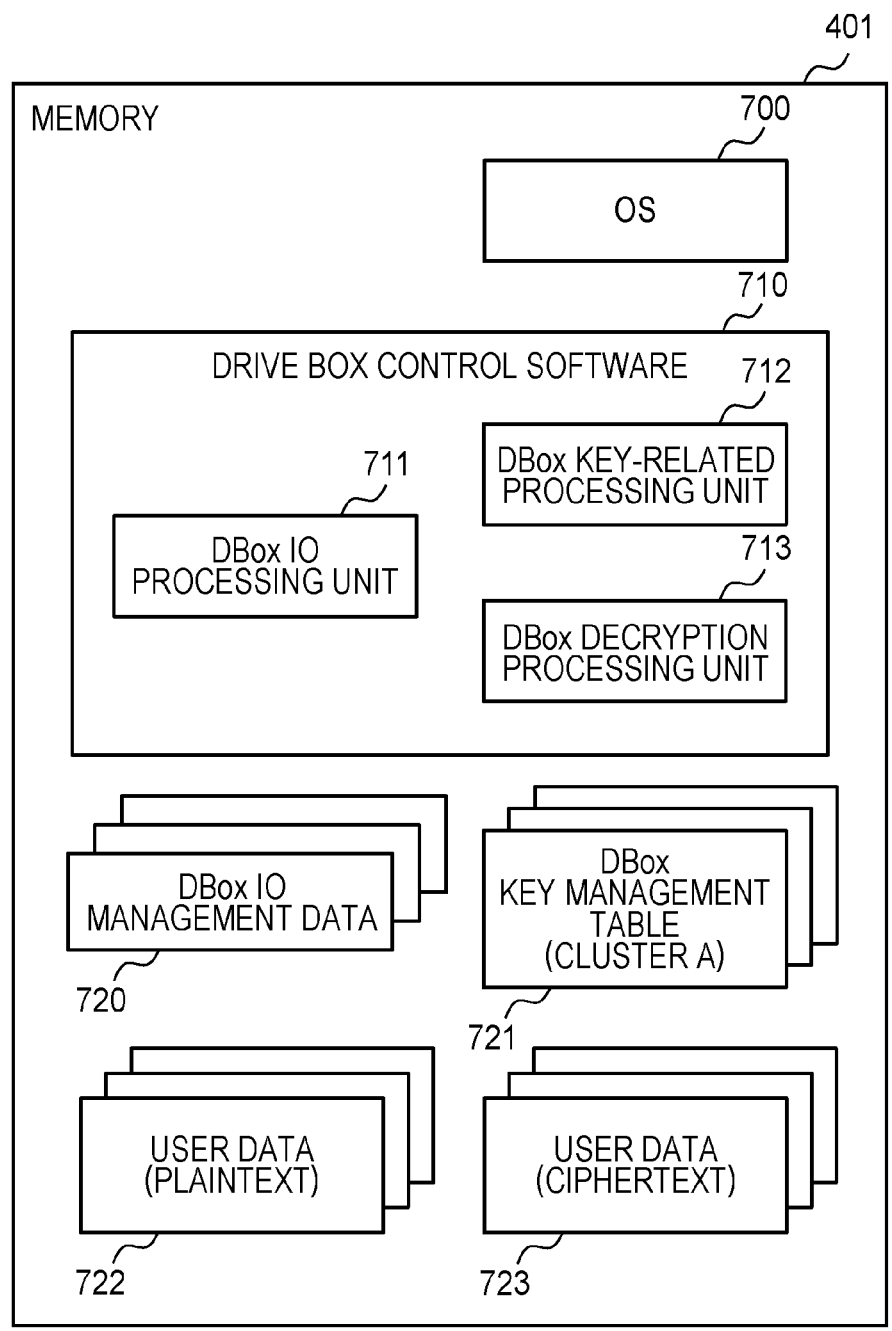
FIG. 7 is a block diagram illustrating an example of data placed in a memory of the drive box.

FIG. 7 is a block diagram illustrating an example of data placed in the memory 401 of the drive box 140.

In the case of FIG. 7, an OS 700 being the basic software, drive box control software 710, DBox IO management data 720, a DBox key management table 721, plaintext user data 722, and ciphertext user data 723 are placed in the memory 401. Further, as illustrated in FIG. 7, the drive box control software 710 includes a DBox IO processing unit 711, a DBox key-related processing unit 712, and a DBox decryption processing unit 713. "DBox" indicates operating on the drive box 140.

The DBox IO management data 720 includes, for example, a content (including information specifying a storage area as write destination or a read source) of a write request or a read request received from the storage control node 120, and a content (including information specifying a storage area as a write destination or a read source, in the drive box 140) of a request transmitted to the aimed drive in the drive box 140 by the DBox IO processing unit 711 of the drive box 140 in response to the request.

The DBox key management table 721 is a table in which a storage area as a write destination/read source of user data, an identifier of key data allocated to this storage area, and key data specified by the identifier are associated with each other. Details of the DBox key management table 721 will be described later with reference to FIG. 9.

As described above, the drive box control software 710 includes the DBox IO processing unit 711, the DBox key-related processing unit 712, and the DBox decryption processing unit 713.

Among the units, the DBox IO processing unit 711 receives a write/read request from the storage control node 120 (also receives the plaintext data as a write target in the case of the write request) and places DBox IO management data 720 on the memory 401. In addition, the DBox IO processing unit 711 transmits the write/read request to the drive box 140 specified by information on a write destination/read source, which is included in the DBox IO management data 720 (also transmits ciphertext user data 723 as the write target in the case of the write request). When the DBox IO processing unit 711 has received the read request from the storage control node 120, in a case where a notification is performed so that the transmission destination of the read user data in the read request is the compute node 110, the DBox IO processing unit 711 requests the DBox decryption processing unit 713 to decrypt the ciphertext user data 723 read from the drive.

The DBox decryption processing unit 713 receives information specifying the drive as the read source from the DBox IO processing unit 711, and then acquires key data from the DBox key management table 721 based on the received information. Then, the DBox decryption processing unit 713 decrypts the ciphertext user data 723 with the acquired key data and places the plaintext user data 722 on the memory 401.

The DBox key-related processing unit 712, for example, performs communication with the StrCtl key-related processing unit 612 of the storage control node 120 (reception of key data), and places the key data received from the storage control node 120 in the DBox key management table 721.

Most of the functional units illustrated in FIGS. 6 and 7 have the notation "StrCtl" or "DBox" indicating the operating location, at the beginning of the name. In the following description, when it is clear whether the indicated functional unit is an element of the storage control node 120 or the drive box 140, the functional unit may be described with the name with "StrCtl" or "DBox" omitted.

FIG. 8 is a diagram illustrating an example of a configuration of the StrCtl key management table 621. A StrCtl key management table 800 illustrated in FIG. 8 is an example of the StrCtl key management table 621 used in the storage control node 120 (specifically, the storage control node 121 or 122) for the cluster A. The structure of the StrCtl key management table 621 used in the storage control node 120 belonging to another cluster (for example, the storage control node 123 for the cluster B) may be considered to be similar.

As illustrated in FIG. 8, the StrCtl key management table 800 includes data items of a cluster ID 810, a drive box IP address 811, a target ID 812, a drive ID 813, availability 814, a key ID 815, and a key value 816. Each data item will be described below.

The cluster ID 810 indicates an identifier (cluster ID; CLID) of a cluster to which the own node (storage control node 120) belongs. In this example, CLID assigned to the cluster A is stored. The drive box IP address 811 indicates an IP address of the drive box 140 that writes/reads user data from the storage control node 120 belonging to the cluster specified by the cluster ID 810. The cluster ID 810 and the drive box IP address 811 may not be necessarily set as the data items of the StrCtl key management table 800 when another type of data for causing each storage control node 120 to manage the cluster includes information indicated by the same items.

The target ID 812 indicates an identifier (target ID; TID) for specifying a storage area as a write destination/read source of user data which is set to a target when the own node requests writing/reading of the user data. The drive ID 813 indicates an identifier (drive ID; DID) of the drive that provides the storage area specified by the target ID 812. The TID and the DID are exemplified in this example. Other information may be used instead of the target ID 812 and the drive ID 813 so long as a storage area in which the own node writes and reads user data and the drive constituting the storage area can be specified.

The availability 814 indicates a state (Availability) of availability of the drive specified by the drive ID 813. Specifically, for example, the availability 814 is stored as "A (Available)" when the drive is available, and is stored as "NA (Non Available)" when the drive is unavailable. Similar to the cluster ID 819 and the drive box IP address 811, the availability 814 may not be necessarily set as the data item of the StrCtl key management table 800 when another type of data for causing each storage control node 120 to manage the cluster includes information indicated by the same item.

The key ID 815 indicates an identifier (key ID) assigned to the key data generated by the key management server 130. The key value 816 indicates a value (key value) of the key data specified by the key ID 815. For example, in a case where the key management server 130 supports the KMIP protocol which is generally known, when generation of key data is requested to the key management server 130, the key management server transmits the value (key ID) of the identifier for specifying the key data generated in response to the request, to the request source of key data generation, as a response. The request source of key data generation statically stores the received key ID. When the key data is required, the request source transmits the value of the key ID for specifying the required key data, to the key management server 130 together with a transmission request of the key data. As a response to this transmission, the request source of key data generation can receive the value (key value) of the required key data from the key management server 130.

Thus, when the "request source of key data generation" is the storage control node 120 (121 or 122) for the cluster A, the StrCtl key management table 800 can store the identifier of the key data generated by the key management server 130, in the key ID 815. When the key data is required, the value of the required key data can be stored in the key value 816.

In the StrCtl key management table 800 for the cluster A, the values of the cluster ID 810, the drive box IP address 811, the target ID 812, the drive ID 813, and the key ID 815 are statically stored in the drive 310 in the storage control node 120 (specifically, the storage control node 121 or 122) at the stage of setting related to the cluster A. After the storage control node 120 (specifically, the storage control node 121 or 122) and the drive box 140 (specifically, the drive box 141 or 142) belonging to the cluster A are initiated, the StrCtl IO processing unit 611 or the StrCtl key-related processing unit 612 acquires the values of the availability 814 and the key value 816 from the corresponding drive box 140 and key management server 130, and places the acquired values in the regions for the items on the memory 301. From the viewpoint of data confidentiality, at least the value of the key value 816 is preferably handled as volatile information (stored on a volatile storage medium).

FIG. 9 is a diagram illustrating an example of a configuration of the DBox key management table 721. A DBox key management table 900 illustrated in FIG. 9 is an example of the DBox key management table 721 used in the drive box 141. The DBox key management table 721 used in another drive box 140 (specifically, the drive box 142) has just a different cluster of the storage control node 120 that receives a write/read request of user data, and thus may be considered to be similar. As described with reference to FIG. 1, it is assumed that the drive box 141 receives the write/read request of user data from both the storage control node 121 or 122 belonging to the cluster A and the storage control node 123 belonging to the cluster B, and thus a storage area for each cluster is constructed in the drives 410 to 413 of the drive box 141.

As illustrated in FIG. 9, the DBox key management table 900 includes data items of a cluster ID 910, a target ID 912, a drive ID 913, availability 914, a key ID 915, and a key value 916. Since the meaning of each data item is the same as the data item having the same name in the StrCtl key management table 800 described with reference to FIG. 8, the description thereof will be omitted.

The Dbox key management table 900 is different from the StrCtl key management table 800 in that only information regarding a storage area (storage space) constructed in the own drive box 141 is stored. As described above, the drive box 141 provides storage areas for both the clusters A and B. Therefore, in the case of FIG. 9, in the DBox key management table 900, CLID values of both the clusters A and B are described in the cluster ID 910, and the values of the identifiers of the storage space and the drive used in the cluster specified by the CLID value are described in the target ID 912 and the drive ID 913. More specifically, in the row 901, the availability 914, the key ID 915, and the key value 916 are registered only for the TID (target ID 912) of the storage space for the cluster A constructed in the own drive box 141 and the DID (drive ID 913) of the drive that provides the storage space. Similarly, in the row 902, the availability 914, the key ID 915, and the key value 916 are registered only for the TID (target ID 912) of the storage space for the cluster B constructed in the own drive box 141 and the DID (drive ID 913) of the drive that provides the storage space.

(2) Processing

A processing procedure of data processing performed by the information processing system 100 according to the present embodiment will be described below in detail.

(2-1) Key Data-related Processing

Figure 10:
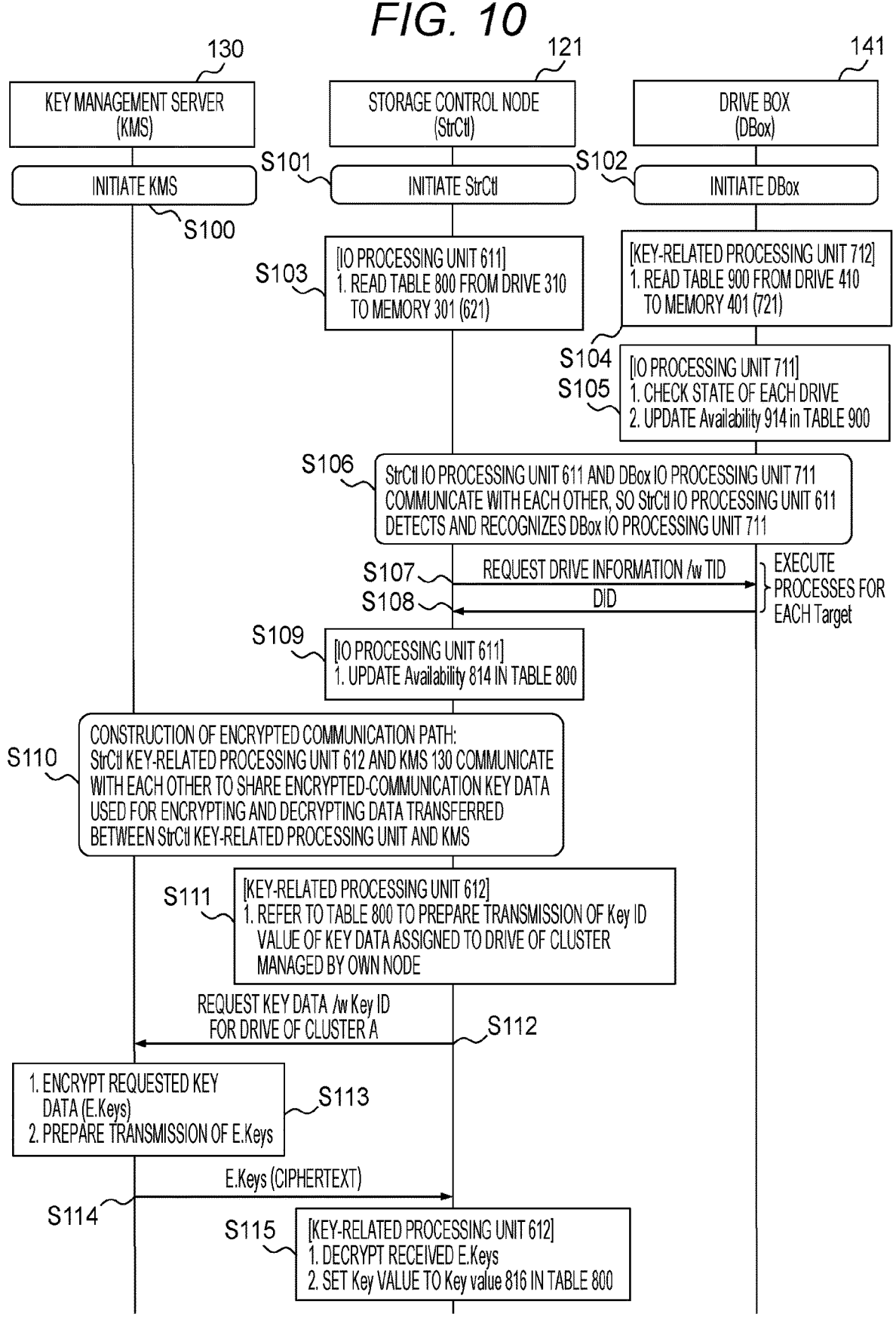
FIG. 10 is a sequence diagram (part 1) illustrating an example of a processing procedure of key data-related processing.
Figure 11:
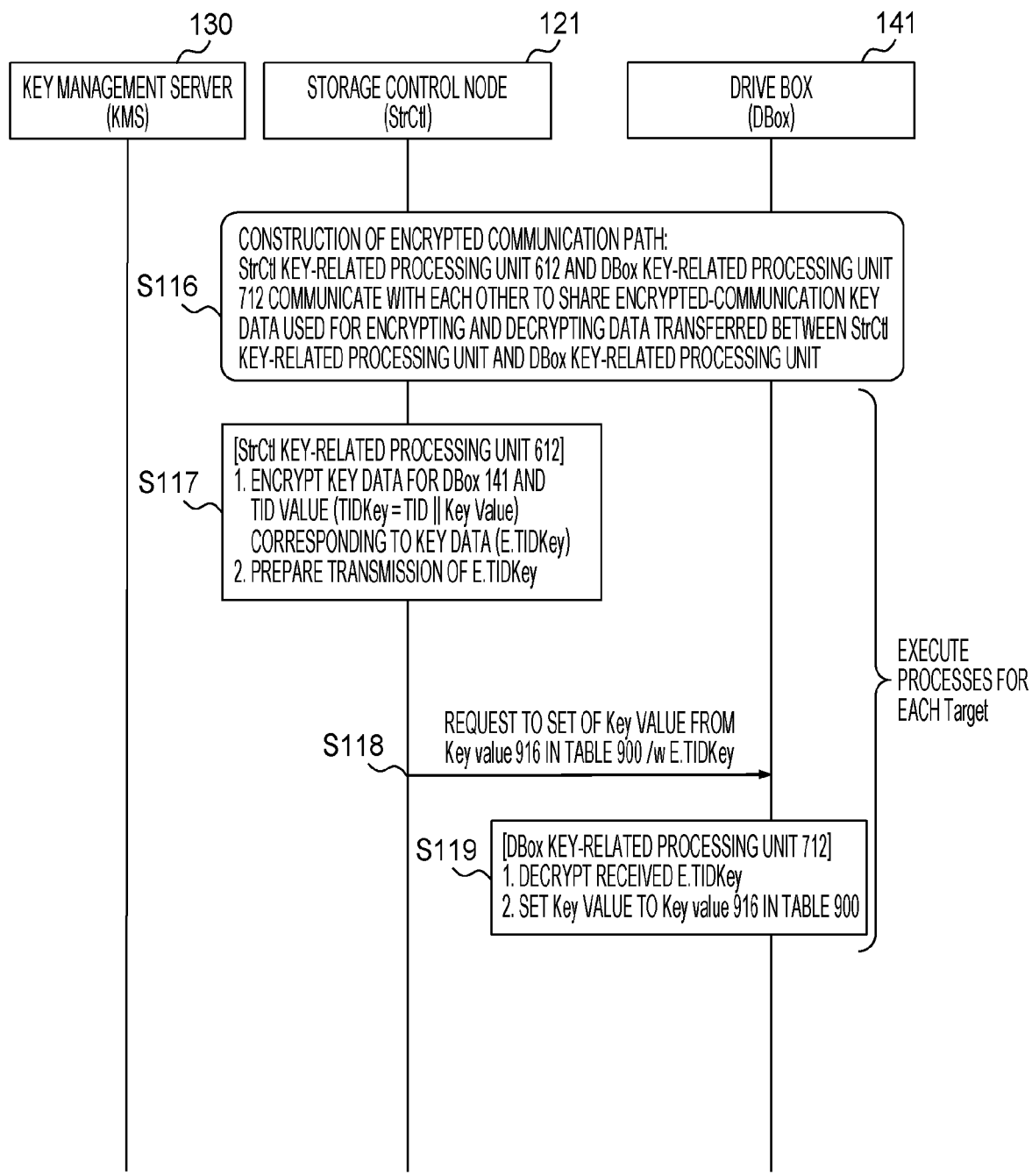
FIG. 11 is a sequence diagram (part 2) illustrating the example of the processing procedure of the key data-related processing.

FIGS. 10 and 11 are sequence diagrams (parts 1 and 2) illustrating an example of the processing procedure of key data-related processing. The key data-related processing is processing related to key data used to encrypt and decrypt user data, and is performed by the key management server 130, the storage control node 120, and the drive box 140. In FIGS. 10 and 11, the storage control node 121 being the master of the cluster A is used as an example of the storage control node 120, and the drive box 141 that provides the storage area for the cluster A is used as an example of the drive box 140. The key data-related processing when the cluster is initiated will be described below with reference to FIGS. 10 and 11. In the following description, it is assumed that the compute node 110 has already been initiated.

According to FIG. 10, first, power is supplied to the key management server 130, the storage control node 121, and the drive box 141 to initiate basic functions (Steps S100, S101, and S102). Specifically, the processing of initiating the basic functions in Steps S100 to S102 corresponds to processing of initiating the StrCtl virtual machine monitor 600 and the StrCtl guest OS 601, processing of reading the storage control software 610 from the drive 310 and placing the storage control software 610 on the memory 301, processing of initiating the OS 700, processing of reading the drive box control software 710 from the drive 410 and placing the drive box control software 710 on the memory 401, and the like.

Then, in the storage control node 121, the StrCtl IO processing unit 611 reads the StrCtl key management table 800 from the drive 310 and places the StrCtl key management table 800 on the memory 301 (Step S103). The StrCtl key management table 800 placed on the memory 301 by the processing in Step S103 corresponds to the StrCtl key management table 621 in FIG. 6. As described above in the description of the StrCtl key management table 800 with reference to FIG. 8, no value is set in the availability 814 and the key value 816 at a time point when the read processing is completed.

In the drive box 141, the DBox key-related processing unit 712 reads the DBox key management table 900 from the drive 410 and places the DBox key management table 900 on the memory 401 (Step S104). The DBox key management table 900 placed on the memory 401 by the processing in Step S104 corresponds to the DBox key management table 721 in FIG. 7. Similar to the StrCtl key management table 800 in Step S1010, no value is set in the availability 914 and the key value 916 at the time point when the read processing is completed.

Subsequently, the DBox IO processing unit 711 checks whether each drive (drive ID 913) registered in the DBox key management table 900 (721) is in an available state, and sets each check result (A/NA) in the availability 914 of the DBox key management table 900 (Step S105).

Then, the StrCtl IO processing unit 611 and the DBox IO processing unit 711 communicate with each other, and thus the StrCtl IO processing unit 611 detects the DBox IO processing unit 711 (Step S106). When detecting the DBox IO processing unit 711 in Step S116, the StrCtl IO processing unit 611 refers to the StrCtl key management table 800 to designate the TID for each drive that provides the storage space registered in the target ID 812 and request the DBox IO processing unit 711 for information including availability (Step S107), and to receive a response from the DBox IO processing unit 711 (Step S108). The request in Step S107 is sequentially or collectively transmitted to all the targets on the drive box 141 registered in the StrCtl key management table 800. When the response to the request is received in Step S108, the StrCtl IO processing unit 611 registers the received information in the availability 814 of the StrCtl key management table 800 (Step S109).

Then, the StrCtl key-related processing unit 612 and the key management server 130 communicate with each other, and perform predetermined authentication processing or the like to share key data for encrypting and decrypting a message or data transferred between the StrCtl key-related processing unit 612 and the key management server 130 (Step S110). As a representative process in Step S110, establishment of a TLS encrypted communication path can be exemplified.

Like the key data shared in Step S110, key data used when the storage control node 121 (120) performs encrypted communication with the key management server 130 or the drive box 141 (140) is different from key data (that is, key data of which the value is registered in the key ID 815 or the key value 816 of the StrCtl key management table 800) used to encrypt or decrypt the user data. Therefore, in the following description, in order to distinguish the pieces of key data, the key data used to perform encrypted communication between the nodes or between the drives may be referred to as "encrypted communication key data".

Then, the StrCtl key-related processing unit 612 refers to the StrCtl key management table 800 on the own memory 301 to acquire the value of the key ID for the drive that provides the storage area of the cluster (cluster A in this example) managed by the own node, and prepare transmission of a transmission request of key data corresponding to the acquired key ID (Step S111). Then, the StrCtl key-related processing unit 612 transmits the key ID to the key management server 130 together with the transmission request of the key data (Step S112).

When receiving the transmission request in Step S112, the key management server 130 encrypts the key data specified by the requested key ID, with the encrypted communication key data generated in Step S110 (encrypted key data is referred to as "E.Keys"), and prepares the transmission (Step S113). Then, the key management server 130 transmits the encrypted E.Keys to the StrCtl key-related processing unit 612 (Step S114).

When receiving the E.Keys in Step S114, the StrCtl key-related processing unit 612 decrypts the E.Keys with the encrypted communication key data shared in Step S110, and sets the value of the decrypted key data in the key value 816 of the StrCtl key management table 800 (Step S115).

Then, as illustrated in FIG. 11, the StrCtl key-related processing unit 612 and the DBox key-related processing unit 712 communicate with each other, and perform predetermined authentication processing or the like to share key data (encrypted communication key data) for encrypting and decrypting a message or data transferred between the StrCtl key-related processing unit 612 and the DBox key-related processing unit 712 (Step S116). As a representative process in Step S116, establishment of the TLS encrypted communication path can be exemplified.

Then, the StrCtl key-related processing unit 612 refers to the StrCtl key management table 800 on the own memory 301 to encrypt a set of the value (TID value) of the target ID of the storage area constructed on the drive box 141 among storage areas of the cluster (cluster A in this example) managed by the own node, and key data (key value) for the drive that provides the storage area (encrypted set of the TID value and the key data is referred to as "E.TIDKey") and prepare the transmission (Step S117). Then, the StrCtl key-related processing unit 612 transmits the E.TIDKey to the Dbox key-related processing unit 712 together with a setting request of the key data in the Dbox key management table 900 (Step S118).

When receiving the E.TIDKey in Step S118, the DBox key-related processing unit 712 decrypts the E.TIDKey with the encrypted communication key data shared in Step S116, and sets the value of the decrypted key data in the key value 916 of the DBox key management table 900 (Step S119). The processing of Steps S117 to S119 is performed sequentially or collectively for all the storage areas (targets) for the cluster A, which are constructed on the drive box 141.

As described above, the key data used to encrypt the user data in the storage control node 121 is also stored on the memory 401 of the drive box 141, by performing the processing of Steps S100 to S119. As illustrated in FIG. 1, the information processing system 100 is configured to include a plurality of storage control nodes 120 (121, 122, and 123). Processing in which the master storage control node 120 (121 or 123) that handles each cluster receives key data from the key management server 130, and then distributes the key data to the slave storage control node 120 (122) is performed between the plurality of storage control nodes 120.

(2-2) User Data Write Processing

Figure 12:
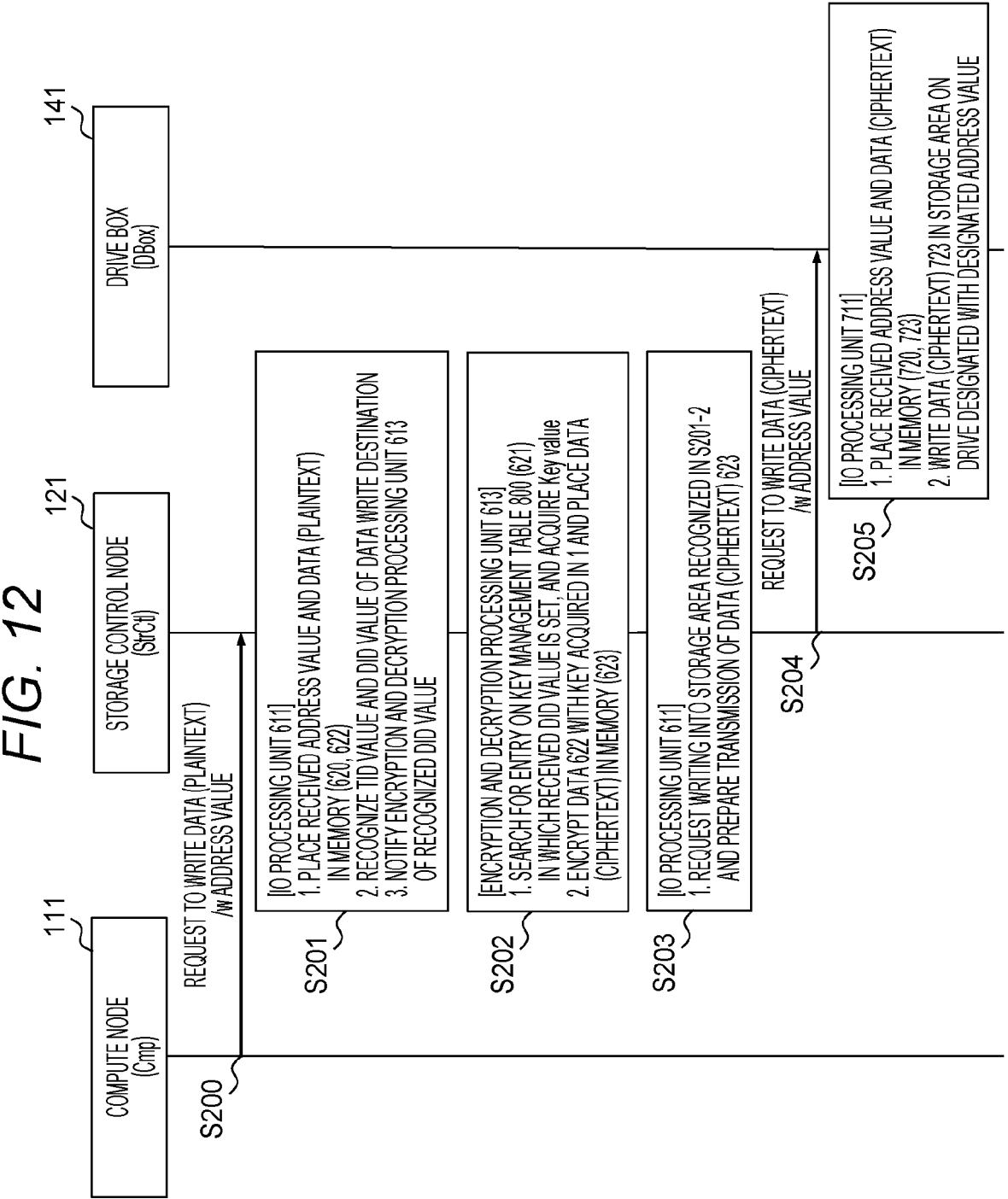
FIG. 12 is a sequence diagram illustrating an example of a processing procedure of user data write processing.

FIG. 12 is a sequence diagram illustrating an example of a processing procedure of the user data write processing. FIG. 12 illustrates a series of processes when writing of user data is requested to the cluster A. Thus, the compute node 111, the storage control node 121, and the drive box 141 are used as an example. In the following description, it is assumed that the compute node 111 has already been initiated.

According to FIG. 12, first, the compute node 111 transmits plaintext user data (write target data) as a write target to the storage control node 121 together with a write request and an address value for specifying the storage area as a write destination (Step S200). Messages and data transmitted in Step S200 are received by the StrCtl IO processing unit 611 of the storage control node 121.

Then, in the storage control node 121, the StrCtl IO processing unit 611 places the address value and the plaintext write target data received in Step S200, on the memory 301. Specifically, the address value is placed in the StrCtl IO management data 620, and the write target data is placed in the user data 622. The StrCtl IO processing unit 611 refers to the StrCtl key management table 800 (621) by using the address value to recognize the value (TID value) of the target ID of the storage area as the write destination of data and the value (DID value) of the drive ID of the drive that provides the storage area. The StrCtl IO processing unit 611 notifies the StrCtl encryption and decryption processing unit 613 of the recognized DID value (Step S201).

Then, the StrCtl encryption and decryption processing unit 613 searches for the drive ID 813 of the StrCtl key management table 800 by using the DID value notified in Step S201, detects an entry in which the DID value is set, and acquires the key value 816 in the entry. The StrCtl encryption and decryption processing unit 613 encrypts the plaintext user data 622 (write target data) stored on the memory 301 by using the acquired key value (key data), and places the encrypted user data in the user data 623 on the memory 301 (Step S202).

Then, the StrCtl IO processing unit 611 prepares the ciphertext user data placed in the user data 623 in Step S202 and the address value of the storage area recognized in Step S201, in order to transmit the write request to the drive box 141 (Step S203). Then, the StrCtl IO processing unit 611 transmits the user data and the address value prepared in Step S203, to the drive box 141 together with the write request (Step S204).

When receiving the write request in Step S204, the DBox IO processing unit 711 of the drive box 141 places the received address value and the ciphertext user data on the memory 401. Specifically, the address value is placed in the DBox IO management data 720, and the ciphertext user data is placed in the user data 723. Further, the DBox IO processing unit 711 writes the ciphertext user data 723 in the storage area on the drive (any one of the drives 411 to 413) specified from the address value designated in the write request (Step S205).

As described above, when writing of plaintext user data is requested from the compute node 111 by performing the processing of Steps S200 to S205, the user data as the write target is encrypted by the storage control node 121, and the encrypted user data is written in a physical storage area of the drive box 141.

(2-3) User Data Read Processing

Figure 13:
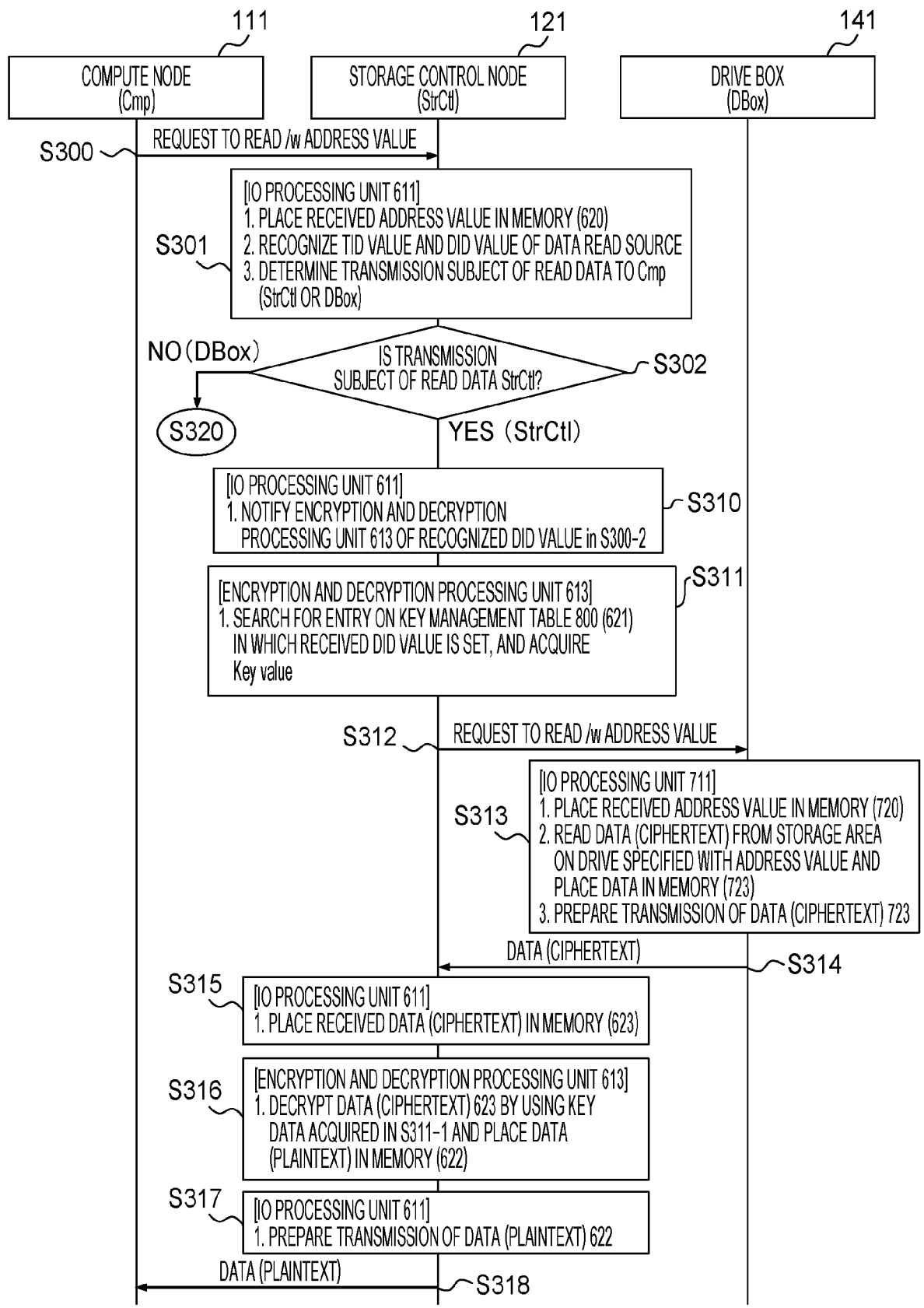
FIG. 13 is a sequence diagram (part 1) illustrating an example of a processing procedure of user data read processing.
Figure 14:
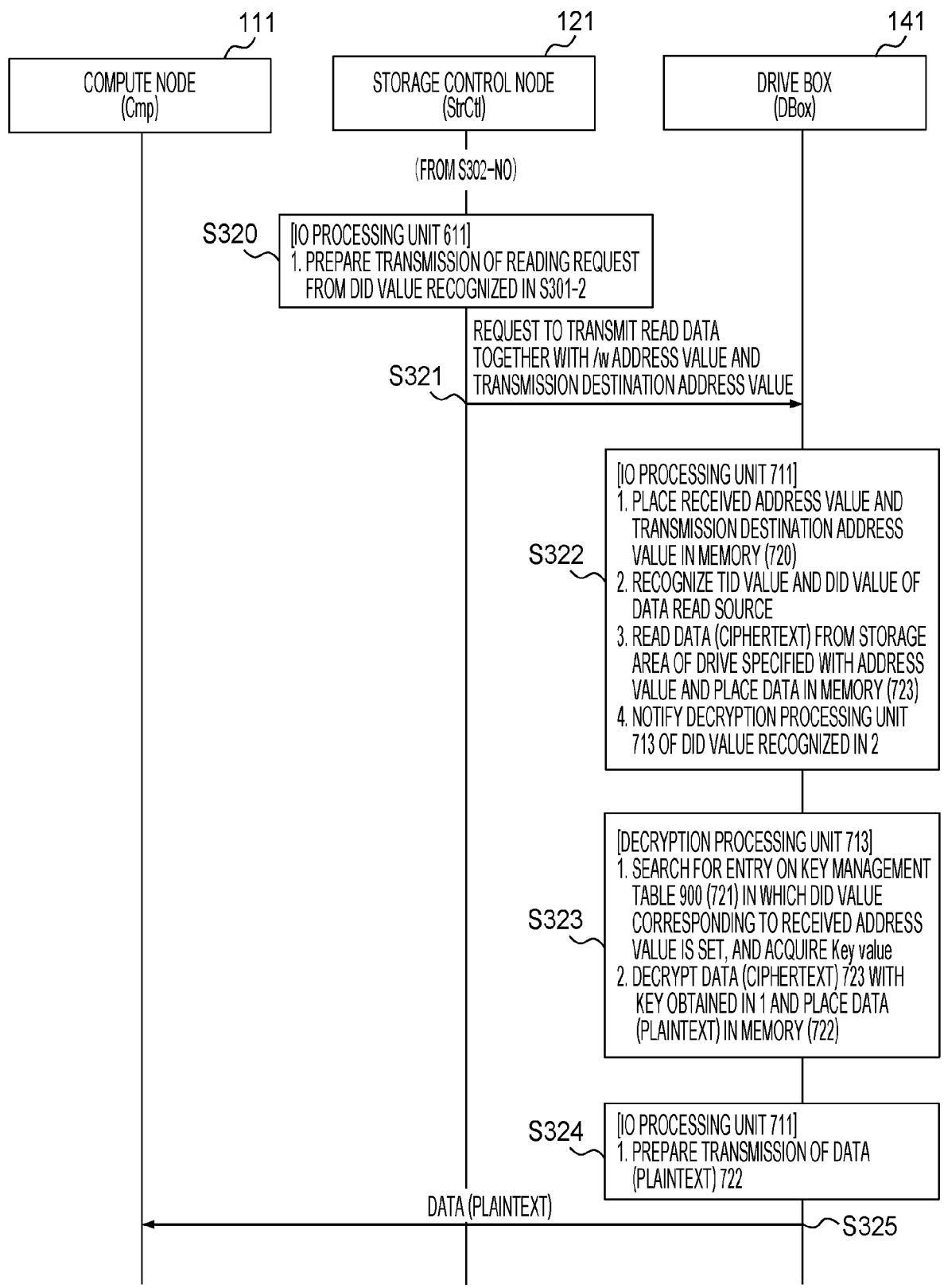
FIG. 14 is a sequence diagram (part 2) illustrating the example of the processing procedure of the user data read processing.

FIGS. 13 and 14 are sequence diagrams (parts 1 and 2) illustrating an example of the processing procedure of the user data read processing. FIGS. 13 and 14 illustrate a series of processes when reading of user data is requested to the cluster A. Thus, the compute node 111, the storage control node 121, and the drive box 141 are used as an example. In the following description, it is assumed that the compute node 111 has already been initiated.

According to FIG. 13, first, the compute node 111 transmits a read request to the storage control node 121 with an address value for specifying the storage area as the read source (Step S300). Messages transmitted in Step S300 are received by the StrCtl IO processing unit 611 of the storage control node 121.

Then, in the storage control node 121, the StrCtl IO processing unit 611 places the address value received in Step S300 in the StrCtl IO management data 620 on the memory 301. The StrCtl IO processing unit 611 refers to the StrCtl key management table 800 (621) by using the address value to recognize the value (TID value) of the target ID of the storage area as the read source of data and the value (DID value) of the drive ID of the drive that provides the storage area. Then, the StrCtl IO processing unit 611 determines whether the own node (that is, the storage control node 121) or the drive box 141 transmits the requested user data to the compute node 111 (Step S301).

Here, a method of determining a transmitter (also referred to as a read data transmission source below) of the user data to the compute node 111 will be supplemented. As the method of determining the transmitter, various methods can be adopted, and specifically, for example, first to third methods as follows can be considered. The first method is to set a transmitter in advance for each storage space specified by the TID value. The second method is to cause the read request transmitted to the storage control node 121 by the compute node 111 in Step S300 to include information for designating the transmitter. The third method is that the storage control node 121 evaluates the processing load in the storage control node 121 and the drive box 141 performed when the read request in Step S300 is received, and the storage control node 121 determines that the transmitter is the one who can respond in a shorter time. In the first or second method, it is preferable to require explicit setting or designation in order to determine the drive box 141 (in a broad sense, the drive box 140) as a read data transmission source. When the transmitter is not set or not designated, it is preferable to consider that the read data transmission source is the storage control node 121 (in a broad sense, the storage control node 120).

After the processing of Step S301, the StrCtl IO processing unit 611 branches the subsequent processing in accordance with the determined read data transmission source (Step S302). Specifically, when the read data transmission source is the storage control node 121 (YES in Step S302), the process proceeds to the processing of Step S310 and the subsequent steps. When the read data transmission source is the drive box 141 (NO in Step S302), the process proceeds to the processing in and after Step S320 illustrated in FIG. 14.

First, processing of Steps S310 to S318 in a case where the storage control node 121 transmits the user data as a read target to the compute node 111 will be described.

In Step S310, the StrCtl IO processing unit 611 notifies the StrCtl encryption and decryption processing unit 613 of the DID value recognized in Step S301.

Then, the StrCtl encryption and decryption processing unit 613 searches for the drive ID 813 of the StrCtl key management table 800 by using the DID value notified in Step S310, detects an entry in which the DID value is set, and acquires the key value 816 in the entry. Then, the StrCtl encryption and decryption processing unit 613 places the acquired key value (key data) on the memory 301 (Step S311).

Then, the StrCtl IO processing unit 611 transmits the address value of the storage area recognized in Step S310 to the drive box 141 together with the read request (Step S312).

When receiving the read request in Step S312, the DBox IO processing unit 711 of the drive box 141 places the address value designated in the write request, in the DBox IO management data 720 on the memory 401. Further, the DBox IO processing unit 711 reads the ciphertext user data (read target data) stored in the storage area from the storage area on the drive (any of the drives 411 to 413) specified from the address value designated in the write request. Then, the DBox IO processing unit 711 places the user data in the user data 723 on the memory 401, and prepares transmission of the ciphertext user data 723 (Step S313). Then, the DBox IO processing unit 711 transmits the ciphertext user data 723 prepared in Step S313 to the storage control node 121 (Step S314).

When receiving the data transmission in Step S314, the StrCtl IO processing unit 611 of the storage control node 121 places the received ciphertext user data in the user data 623 on the memory 301 (Step S315).

Then, the StrCtl encryption and decryption processing unit 613 decrypts the ciphertext user data 623 stored on the memory 301 by using the key value (key data) acquired in Step S311, and places the decrypted plaintext user data (read target data) in the user data 622 on the memory 301 (Step S316).

Then, the StrCtl IO processing unit 611 prepares transmission of the plaintext user data 622 placed in Step S316 (Step S317), and then transmits the user data to the compute node 111 (Step S318).

By performing the processing of Steps S310 to S318 as described above, the user data as the read target, which is stored in the ciphertext in the drive box 141 is transmitted from the drive box 141 to the storage control node 121. The user data is decrypted into the plaintext by the storage control node 121, and then transmitted from the storage control node 121 to the compute node 111.

Next, processing in Steps S320 to S325 in a case where the drive box 141 directly transfers the user data as the read target to the compute node 111 will be described.

In Step S320, the StrCtl IO processing unit 611 reads the user data from the drive specified by the DID value recognized in Step S301, and prepares transmission of a user data read request in which transmission to the read data transmission source determined in Step S301 is requested. Then, the StrCtl IO processing unit 611 transmits the read request of the user data prepared in Step S320 to the drive box 141 together with the address value for designating the storage area as the read source of the user data and information (transmission destination information) for specifying the compute node 111 as the transmission destination of the read user data (Step S321).

When receiving the message and data transmitted in Step S321, the DBox IO processing unit 711 of the drive box 141 places the received address value and the information of the user data transmission destination in the DBox IO management data 720 on the memory 401. The DBox IO processing unit 711 refers to the DBox key management table 900 (721) by using the address value to recognize the value (TID value) of the target ID of the storage area as the read source of data and the value (DID value) of the drive ID of the drive that provides the storage area. The DBox IO processing unit 711 notifies the DBox decryption processing unit 713 of the recognized DID value (Step S322).

Then, the DBox decryption processing unit 713 searches for the drive ID 913 of the DBox key management table 900 by using the DID value notified in Step S322, detects an entry in which the DID value is set, and acquires the key value 916 in the entry. Then, the DBox decryption processing unit 713 decrypts the ciphertext user data 723 stored on the memory 401 by using the acquired key value (key data), and places the decrypted plaintext user data (read target data) in the user data 722 on the memory 301 (Step S323).

Then, the DBox IO processing unit 711 prepares transmission of the plaintext user data placed in Step S323 (Step S324), and then, transmits the plaintext user data 722 to the compute node 111 specified by the transmission destination information received in Step S321 (Step S325).

By performing the processing of Steps S320 to S325 as described above, the user data as the read target, which is stored in the ciphertext in the drive box 141 is decrypted into the plaintext in the drive box 141, and then is directly transmitted (directly transferred) to the compute node 111.

As described above, in the information processing system 100 according to the present embodiment, when the read request of the encrypted user data stored in the drive box 140 is made from the compute node 110, and the storage control node 120 that has received the read request from the compute node 110 makes the read request of data to the drive box 140, the drive box 140 is notified whether the direct transmission destination of the read data is the storage control node 120 or the compute node 110, and the drive box 140 transmits the data read from the drive to the notified transmission destination. At this time, when the direct transmission destination of the read data is the storage control node 120, the data as the read target is transmitted from the drive box 140 to the storage control node 120 in a form of the ciphertext. The data is decrypted into the plaintext by the storage control node 120, and then transmitted to the compute node 110. When the direct transmission destination of the read data is the compute node 110, the ciphertext data as the read target is decrypted into the plaintext in the drive box 140 and directly transmitted to the compute node 110 without passing through the storage control node 120.

According to such an information processing system 100, even in a configuration in which data requested to be written from the compute node 110 (compute server) is encrypted by the storage control node 120 (storage control server) and written in the drive box (drive box 140), when reading of the encrypted data of the drive box is requested from the compute server, the drive box can directly transmit the decrypted target data to the compute server that has issued the read request.

Although not illustrated in FIGS. 13 and 14, in response to the read request of the user data from the compute node 111 (Step S300), the storage control node 121 may search the own cache (for example, the memory 301). When the user data as the read target is stored in the cache, the storage control node 121 may transmit the user data to the compute node 111. The cache search processing may be performed between Step S300 and Step S301 in FIG. 13. When a cache hit occurs, the target data is transmitted from the storage control node 121 to the compute node 111 even though the read data transmission source is designated in the drive box 141 by the message in Step S300. In such a configuration, it is not necessary to perform the processing of Step S301 and subsequent steps at the time of the cache hit. Thus, it is possible to greatly shorten the processing time required for reading the user data.

Hitherto, one embodiment of the present invention has been described in detail above, but the present invention is not limited to the above-described embodiment, and includes various modifications.

For example, in the key data-related processing illustrated in FIGS. 10 and 11, the key data which is used for encrypting and decrypting the user data and is generated by the key management server 130 is transmitted from the key management server 130 to the drive box 140 (141) via the storage control node 120 (121) at the time of booting (cluster initiation), but the timing and path at which the drive box 140 shares the key data used for encryption and decryption with the storage control node 120 are not limited thereto.

As another example of the timing at which the drive box 140 shares the key data used for encryption and decryption, the key data may be transmitted to the drive box 140 when the read request of the user data is made from the compute node 110 (Step S300 in FIG. 13). In this case, specifically, for example, processing similar to Step S116 in FIG. 11 may be performed at a timing between Step S300 and Step S313 in FIG. 13 to share the key data between the storage control node 120 and the drive box 140. In the case of adopting the above another example, the drive box 140 does not store the key data unless the data read request is made. Thus, the overall processing speed of the user data read processing is reduced in comparison to the case of sharing the key data at the time of booting, but it is possible to improve the safety. When it is desired to further improve the safety, the key data shared by the drive box 140 may be discarded every time one time of the user data read processing ends.

As another example of the path in which the drive box 140 shares the key data used for encryption and decryption, the drive box 140 may directly receive the key data from the key management server 130 instead of relaying the storage control node 120 and receiving the key data.

Some or all of the configurations, functions, functional units, processing means, and the like may be realized in hardware by being designed with an integrated circuit, for example. Further, the above-described respective components, functions, and the like may be realized by software by the processor interpreting and executing a program for realizing the respective functions. Information such as a program, a table, and a file, that realizes each function can be stored in a memory, a recording device such as a hard disk and an SSD, or a recording medium such as an IC card, an SD card, and a DVD.

Control lines and information lines considered necessary for the descriptions are illustrated in the drawings, and not all the control lines and the information lines in the product are necessarily shown. In practice, it may be considered that almost all components are connected to each other.

What is claimed is:

1. An information processing system in which a drive box including one or more non-volatile storage media that store data and a storage control server that processes data input and output to and from the drive box are connected to each other via a network, wherein
   the storage control server manages key data for encrypting and decrypting the data,
   the drive box stores encrypted data and acquires the key data of the data at a predetermined timing,
   the storage control server that has received a read request of data from a compute server transmits the read request to the drive box,
   the drive box that has received the read request from the storage control server reads encrypted read target data corresponding to the read request from the non-volatile storage media, decrypts the read target data with the key data acquired at the predetermined timing, and then transmits the decrypted read target data to the compute server as a read request source.

2. The information processing system according to claim 1, wherein
   the storage control server that has received the read request from the compute server determines which of the drive box and the storage control server transmits the read target data to the compute server, and then transmits the read request to the drive box that stores the read target data, and
   when the storage control server determines that the drive box transmits the read target data, the drive box that has received the read request reads the encrypted read target data, decrypts the encrypted read target data with the key data, and transmits the decrypted read target data to the compute server,
   when the storage control server determines to transmit the read target data, the drive box that has received the read request reads the encrypted read target data and transmits the encrypted read target data to the storage control server, and the storage control server that has received the encrypted read target data decrypts the encrypted read target data with the key data and transmits the decrypted read target data to the compute server.

3. The information processing system according to claim 2, wherein
   the storage control server that has received a write request of data from the compute server encrypts write target data corresponding to the write request, with the key data, and transmits the encrypted write target data to the drive box, and the drive box stores the encrypted write target data received from the storage control server, in the non-volatile storage medium.

4. The information processing system according to claim 1, wherein
data is transmitted and received between the storage control server and the drive box via an encrypted communication path.

5. The information processing system according to claim 1, wherein
the drive box further includes a volatile storage medium, and
the drive box stores a value of the key data managed by the storage control server, in the volatile storage medium.

6. The information processing system according to claim 1, wherein
the storage control server stores a value of the key data and information indicating a state of availability of each of the non-volatile storage media in the drive box, in a volatile storage medium of the storage control server.

7. The information processing system according to claim 1, wherein
the drive box acquires key data having the same value as the key data managed by the storage control server with time of booting as the predetermined timing.

8. The information processing system according to claim 1, wherein
the drive box
acquires key data having the same value as the key data managed by the storage control server with, as the predetermined timing, a time when the storage control server receives the read request from the compute server, and
deletes the acquired key data from the drive box itself after responding to the read request.

9. The information processing system according to claim 1, wherein
the storage control server determines a transmission source that transmits the read target data to the compute server in the read request, based on contents designated in the read request.

10. The information processing system according to claim 9, wherein
when the transmission source is not designated in the read request, the storage control server determines the storage control server itself as the transmission source.

11. The information processing system according to claim 9, wherein
when the read target data in the read request is stored in a cache memory of the storage control server, the storage control server itself reads the encrypted read target data from the cache memory, decrypts the read target data with the key data used in writing, and then transmits the decrypted read target data to the compute server, regardless of designation or setting regarding the transmission source.

12. The information processing system according to claim 1, wherein
a transmission source that transmits the read target data in the read request to the compute server is set in advance for each of one or more storage spaces provided by the drive box, and
the storage control server determines the transmission source in the read request in accordance with the setting for the storage space in which the read target data in the read request is stored.

13. The information processing system according to claim 1, wherein
the storage control server determines a transmission source that transmits the read target data in the read request to the compute server, based on processing loads of the storage control server and the drive box when the read request is received.

14. The information processing system according to claim 1, further comprising:
a key management server that provides the key data,
wherein the storage control server acquires the key data from the key management server, and
the drive box acquires key data having the same value as the key data acquired by the storage control server, directly from the key management server or via the storage control server.

15. A data transfer method by an information processing system in which a drive box including one or more non-volatile storage media that store data and a storage control server that controls a storage space provided by the drive box are connected to each other via a network, the method comprising:
by the storage control server, managing key data for encrypting and decrypting the data;
by the drive box, storing encrypted data and acquiring the key data of the data at a predetermined timing;
by the storage control server that has received a read request of data from a compute server, transmitting the read request to the drive box; and
by the drive box that has received the read request from the storage control server, reading encrypted read target data corresponding to the read request from the non-volatile storage media, decrypting the read target data with the key data acquired at the predetermined timing, and then transmitting the decrypted read target data to the compute server as a read request source.

* * * * *